United States Patent [19]

Takagi

[11] Patent Number: 5,213,391
[45] Date of Patent: May 25, 1993

[54] BODY SKELETON ELEMENT OF VEHICLE AND MANUFACTURING METHOD THEREOF

[75] Inventor: Masahiro Takagi, Zama, Japan
[73] Assignee: Nissan Motor Co., Ltd., Yokohama, Japan
[21] Appl. No.: 770,808
[22] Filed: Oct. 4, 1991

[30] Foreign Application Priority Data

Oct. 25, 1990 [JP] Japan .................................. 2-287611

[51] Int. Cl.⁵ ............................................ B62D 25/04
[52] U.S. Cl. ...................................... 296/205; 296/191; 29/451
[58] Field of Search ............... 296/191, 205, 187, 194, 296/195, 39.3, 203; 138/89, 178, 99; 29/451

[56] References Cited

U.S. PATENT DOCUMENTS 4,440,434  4/1984  Celli ...................................... 296/185
4,863,771  9/1989  Freeman ........................... 296/205 X
4,989,913  2/1991  Moore, II ........................... 296/205

FOREIGN PATENT DOCUMENTS 61-129369  6/1986  Japan .

Primary Examiner—Robert R. Song
Attorney, Agent, or Firm—Pennie & Edmonds

[57] ABSTRACT

A body skeleton structure for a vehicle includes an outer panel arranged on the outside of a body, and an inner panel arranged on the inside of the body. The inner panel cooperates with the outer panel to define a closed cross-sectional space. A bracket is arranged between the outer panel and the inner panel. A thermally foaming rubber sheet is provided on a surface of the bracket. The thermally foaming rubber sheet is so heated and foamed as to be into close contact with the outer panel and/or the inner panel.

5 Claims, 5 Drawing Sheets

BODY SKELETON ELEMENT OF VEHICLE AND MANUFACTURING METHOD THEREOF

BACKGROUND OF THE INVENTION

The present invention relates to a structure of a body skeleton element forming a closed cross-sectional space by an outer panel and an inner panel such as various pillars, a roof side rail, a side sill and the like of a vehicle such as an automobile car, and a method of manufacturing the body skeleton element.

FIGS. 1 through 4 illustrate a structure consisting of an assembly of front pillars, side sills, roof side rails and the like which are conventional body skeleton elements. A front pillar 1 has a closed cross-sectional space which is formed by an outer panel 2 and an inner panel 3. The front pillar 1 has a lower end which is connected to a side sill 4, while an upper end of the front pillar 1 is connected to a roof side rail 5. The roof side rail 5 has a closed cross-sectional space which is formed by a rail outer 6 and a rail inner 7. A front roof rail 9 is connected to an upper side of the front pillar 1 through a three-forked roof rail brace 8. The front pillar 1 is arranged such that a urethane block 10 is filled in a waist section of the front pillar 1, and a foam rubber 11 is filled in an upper end of the front pillar 1. Thus, a sound transmitted from an engine room E is prevented from being transmitted to the interior of a compartment from the pillar closed cross-sectional space through the closed cross-sectional space of the roof side rail 5. In this connection, in FIG. 1, the reference numeral 12 denotes a roof panel; 13, a cowl box; and 14, a front fender. A structure similar to that described above is disclosed in Japanese Patent Laid-Open No. SHO 61-129369, for example.

However, the urethane block 10 is inserted into the pillar closed cross-sectional space from a door-hinge mounting bore 15 which is formed in the inner panel 3 of the front pillar 1. The urethane block 10 does not completely fill in the pillar closed cross-sectional space to every nook and corner. Instead gaps are inevitably defined at the corners of the pillar closed cross-sectional space as illustrated in FIG. 3.

In order to fill the foam rubber 11 as a foaming material, thermally foaming rubber sheets 11a are adhered or glued, respectively to inner side surfaces of the inner panel 3 and the outer panel 2 of the front pillar 1 as indicated by broken lines in FIG. 4, at the upper end of the front pillar 1. After connection of the skeleton elements such as the front pillar 1, the roof side rail 5 and the like, inner and outer surfaces of the skeleton elements are processed in rust preventive, and the outer side surface is finally painted, so that the rubber sheet 11a is foamed by heating while passing through a paint booth during a drying step.

Since, however, the thermally forming rubber sheet 11a per se is not foamed large in the first place, foaming tends to become insufficient with respect to the dimension or size of the pillar closed cross-sectional space. As a result, gaps occur at the corners of the pillar closed cross-sectional space, and voids occur at the central section of the foam rubber 11. Further, the gaps and the voids are formed under a condition in which they cannot be confirmed from the outside. As a result, there is a defect in that no sound isolating effects can be obtained in spite of the fact that expensive sound isolating measures are performed.

Further, since the thermally foaming rubber sheets 11a are adhered also to the inner side surface of the outer panel 2 of the front pillar 1 as described above, the adhered-to sections are not subjected to the rust preventives. For this reason, there is a chance that rust may gather on the surfaces of the adhered-to sections of the outer panel 2, which are exposed to the outside of the vehicle.

SUMMARY OF THE INVENTION

It is an object of the present invention to provide a structure of body skeleton elements for a vehicle, and a method of manufacturing the same, in which sound isolating effects can be raised by a simple arrangement, in which rigidity, is raised and in which floating-up of rust does not occur on a surface of an outer panel.

According to a first aspect of the invention, there is provided a body skeleton structure for a vehicle, comprising:

an outer panel arranged on the outside of a body;

an inner panel arranged on the inside of the body, the inner panel cooperating with the outer panel to form a closed cross-sectional space;

a bracket arranged between the outer panel and the inner panel; and a thermally foaming element provided on a surface of the bracket, the thermally foaming element being heated and foramed to be into close contact with the outer panel and/or the inner panel.

According to the second aspect of the invention, there is also provided a method of manufacturing a body skeleton structure for a vehicle, comprising the steps of:

mounting an outer panel on the outside of a body;

mounting an inner panel on the inside of the body, the inner panel cooperating with the outer panel to form a closed cross-sectional space;

arranging a bracket at a location between the outer panel and the inner panel;

mounting a thermally foaming element on a surface of the bracket;

subjecting rust-preventive painting to an inner side surface of at least the outer panel; and heating the thermally foaming element to foam the same, thereby being into close contact with the outer panel and/or the inner panel.

DETAILED DESCRIPTION OF THE PREFERRED EMBODIMENT

Embodiments of the invention will hereunder be described in detail with reference to the drawings.

Figure 5:
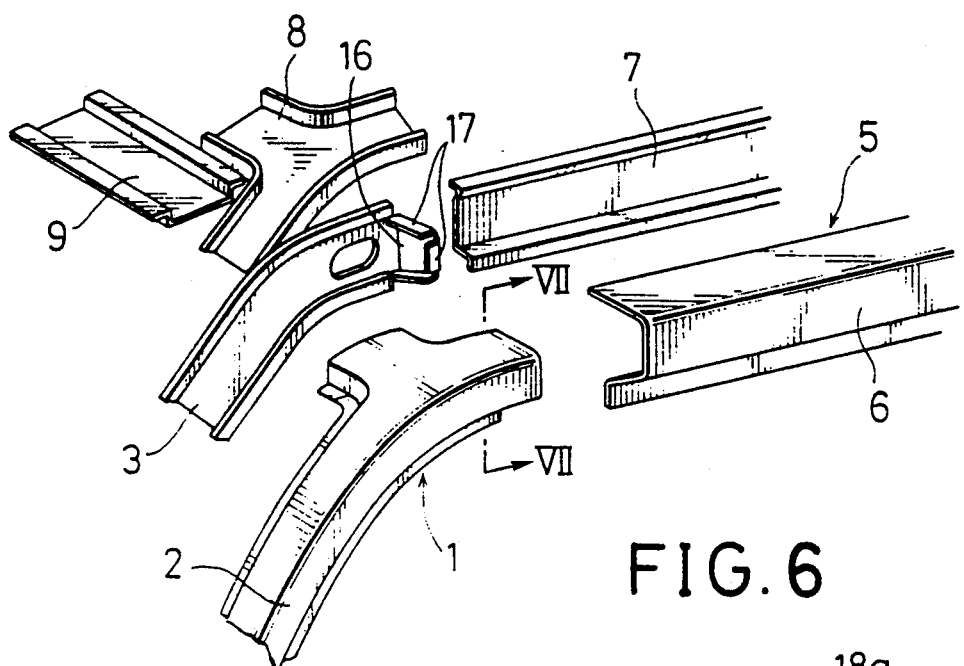
FIG. 5 is an exploded perspective view showing an embodiment of the invention.
Figure 6:
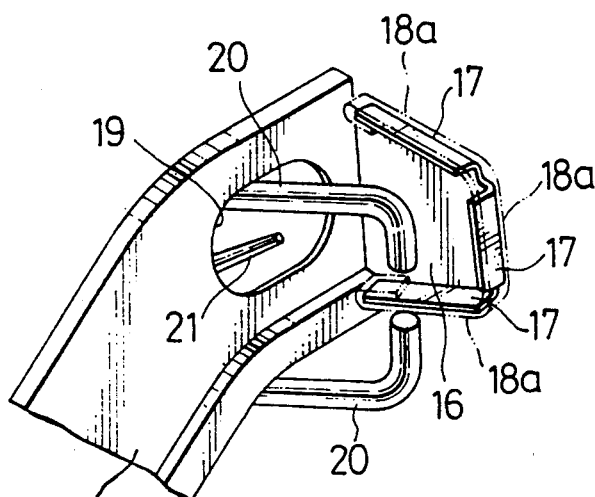
FIG. 6 is an enlarged view of a bracket-section forming portion.
Figure 7:
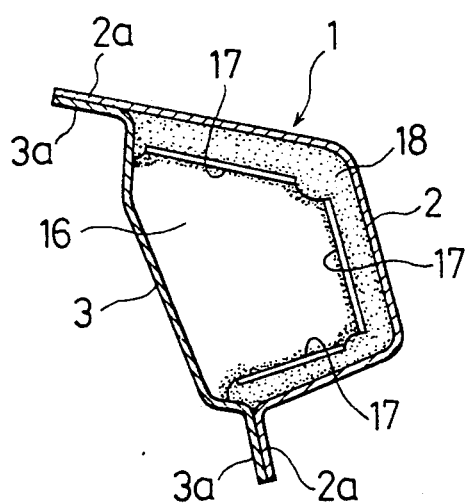
FIG. 7 is a cross-sectional view taken along the line VII—VII in FIG. 5.

FIGS. 5 through 7 illustrate a structure in the vicinity of a connecting section between a roof side rail and a front pillar which serve as body skeleton elements. In FIGS. 5 through 7, an inner panel 3 of a front pillar 1 has an upper terminal or end with which a bracket section 16 is integrally formed in bend. The bracket section 16 faces toward an inner surface of an upper end of an outer panel 2 of the front piller 1, and has flanges 17 which are located with slight gaps left between the inner surface of the upper end of the outer panel 2 and the flanges 17. A thermally foaming rubber sheet 18a is beforehand adhered to the surfaces of the flanges 17 which face toward the outer panel 2. By heating after assembling of a body to be described subsequently (for example, during passage through a painting booth), the rubber sheet 18a is foamed to interpose a foam rubber layer 18 between the flanges 17 and the inner surface of the outer panel 2, so that minute gaps do not occur. Furthermore, as shown in FIG. 6, an operation, or access, bore 19 is provided in the vicinity of a proximal end of the inner panel 3 on which the bracket section 16 is formed. Thus, the arrangement is such that a spot gun 20 can be inserted through the operation bore 19 to conduct combined use of spot joining, and to facilitate a repairing operation such as a subsequent defect in foaming or the like. During the repair the operation bore 19 can be utilized to conduct a sealing operation of the defective or inadequately foamed portions of seam sections between the flanges 17 and the outer panel 2. Ultimately, the operation bore 19 is closed by a grommet (not shown). In a sunroof equipped vehicle, however, a sunroof drain hose can be inserted through the operation bore 19.

Figure 1:
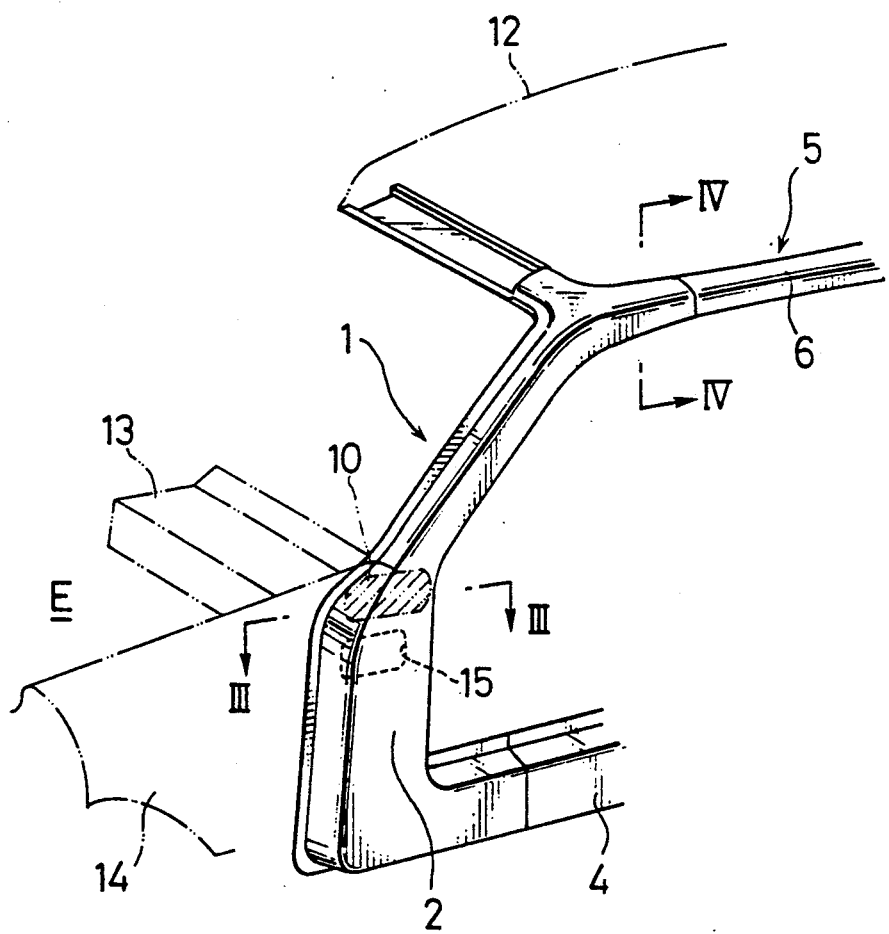
FIG. 1 is a perspective view showing a front skeleton structure of a vehicle.
Figure 2:
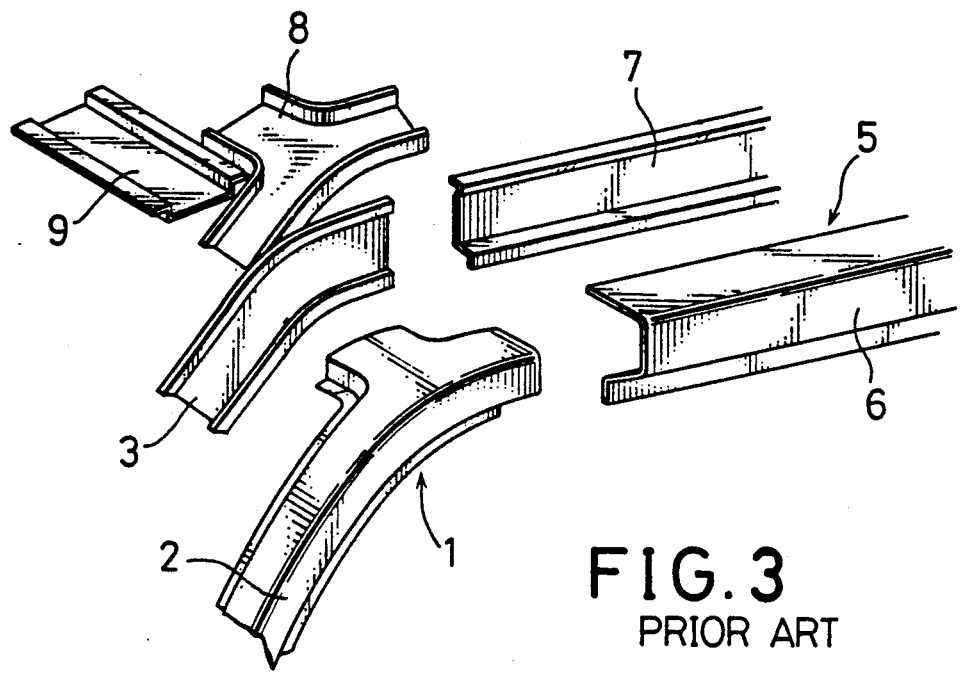
FIG. 2 is an exploded perspective view showing a conventional structure.
Figure 3:
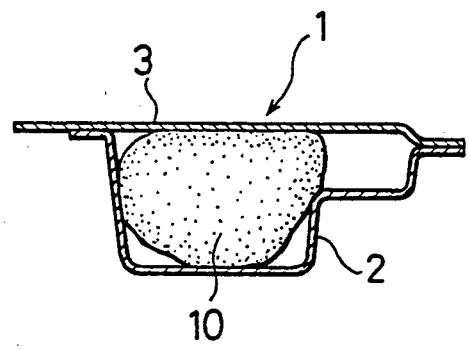
FIGS. 3 and 4 are cross-sectional views taken respectively along the lines III—III and IV—IV in FIG. 1.
Figure 4:
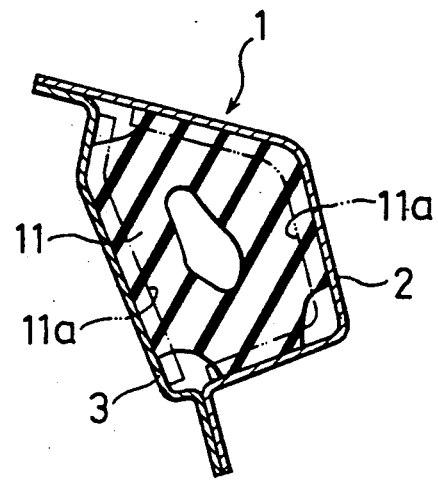

Moreover, in case where the aforesaid spot joining is used in combination, a roof rail brace 8 and a front roof rail 9 are joined to each other after spot joining of the bracket section 16 to the inner panel 3. A urethane block 10 is filled in a base section of the front pillar 1 similarly to the conventional structure illustrated in FIG. 1.

Next, the thermally foaming rubber sheet 18a is glued a priori to the surfaces of the respective flanges 17 of the bracket section 16 of the inner panel 3. The inner panel 3 and the outer panel 2 are joined to each other with the bracket section 16 directed inwardly. Subsequently, their respective side-edge flanges 3a and 2a are spot-joined to each other to form a closed cross-sectional space, thereby forming the front pillar 1. The skeleton elements such as the front pillar 1, a side sill 4, a roof side rail 5, the front roof rail 9, a cowl box 13 and the like are joined to each other to form a body skeleton structure. Further, body outer plates such as a roof panel 12, a front fender 14 and the like are assembled together to form what is called a white body. Subsequently, the white body is immersed in a rust-preventive painting tank to spread the rust-preventive paint to the inner side surface of the each of the skeleton elements, thereby practicing a rust-preventive treatment. After the rust-preventive treatment, the white body is finish-painted and is passed through the painting booth so that the white body is dried. The aforesaid rubber sheet 18a is foamed by heating during its passage through the painting booth so that the flanges 17 of the bracket section 16 and the outer panel 2 of the front pillar 1 are connected to each other through the foam rubber layer 18.

According to the structure of the embodiment as described above, the pillar closed cross-sectional space is so secured as to be defined by the bracket section 16 and the foam rubber layer 18 at the upper end of the front pillar 1, so that the pillar closed cross-sectional space is brought to a condition non-communicating with the closed cross-sectional space of the roof side rail 5. For this reason, even if the transmitting sound and the like from the engine room E are transmitted to the closed cross-sectional space of the front pillar 1, it is possible to cut off or isolate the transmitting sound by the bracket section 16 and the foam rubber layer 18.

Particularly, in the embodiment, the flanges 17 of the bracket section 16 are located adjacent to the inner side surface of the outer panel 2, and the rubber sheet 18a is foamed at the gap to form the foam rubber layer 18. For this reason, even for a rubber sheet which foams a lower than nominal amount, the flanges 17 and the outer panel 2 are brought to an intimate contact condition through the foamed rubber layer 18 so that no small or minute gaps occur.

Furthermore, since the bracket section 16 is mounted so as to straddle the inner panel 3 and the outer panel 2, the bracket section 16 serves as a reinforcement, making it possible to raise the rigidity of the front pillar 1. Since it is possible to raise the rigidity of the upper end of the front pillar by the bracket section 16, it is possible to make the roof difficult to cave in when exposed to a roof pressure-breaking or collapsing input occurring when the vehicle rolls over, which increases safety.

Moreover, since the bracket section 16 is fixedly mounted on a location within the upper end of the front piller 1 by the foam rubber layer 18, a bumpy sound and the like do not occur. Further, even if a determination of the foaming of the layer 18 occurs subsequently, a sealing material can be applied to the seam sections between the flanges 17 and the outer panel 2 through the operation bore 19. Accordingly, the sound isolating effects of the aforementioned transmitting sound is further improved.

On the other hand, the aforesaid thermally foaming rubber sheet 18a is first adhered, or glued, to the surfaces of the flange 17 of the bracket section 16 so that the thermally foaming rubber sheet 18a is heated and foamed after the rust preventive treatment has been applied also to the inner side surface of the front piller 1, under such a condition that the inner panel 3 and the outer panel 2 are joined to each other to form the front pillar 1 of the closed cross-sectional space. For this reason, no non-rust-preventive treatment sections occur on the inner side surface of the outer panel 2. This is very advantageous in view of rust-preventive measures.

Figure 8:
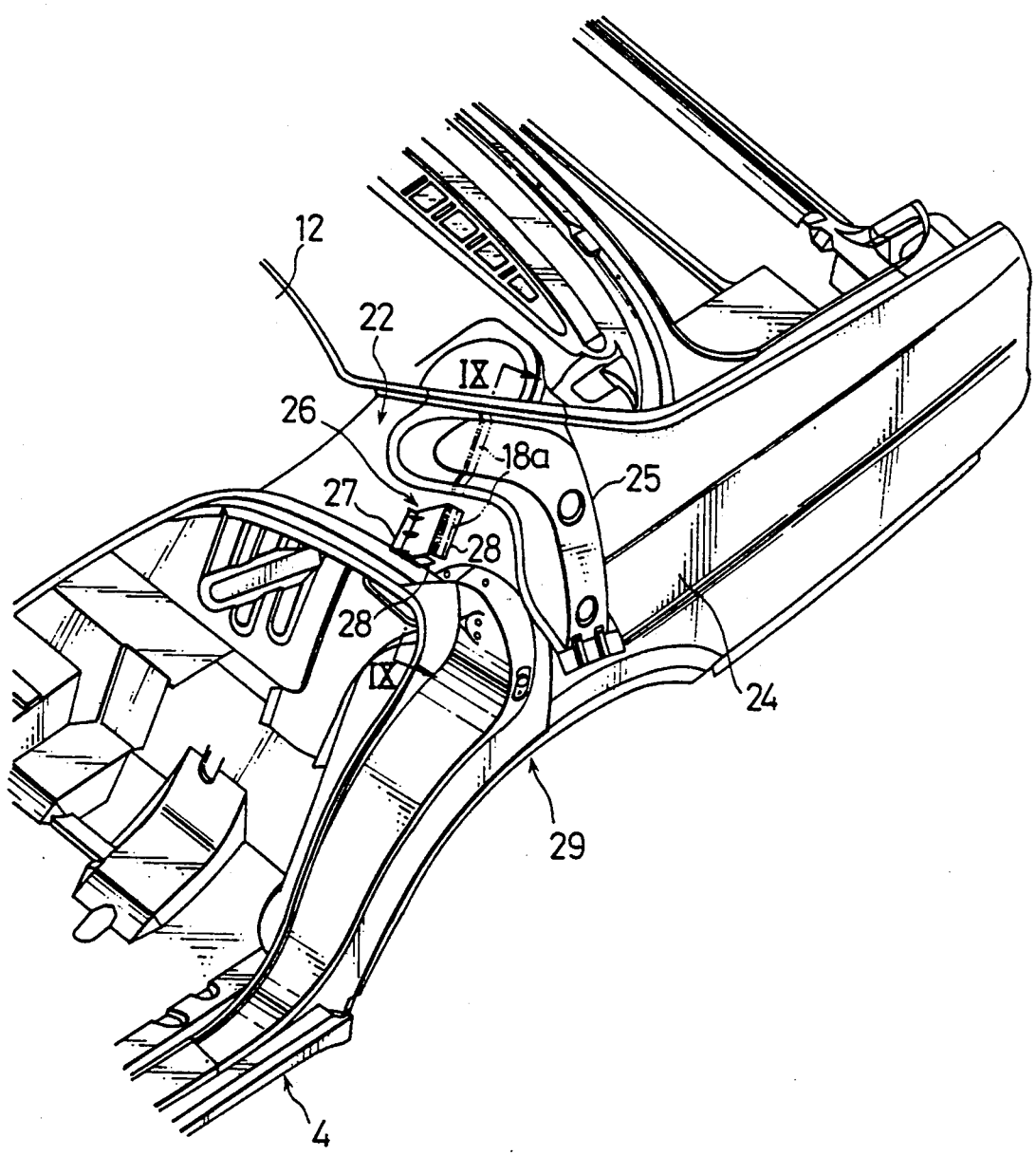
FIG. 8 is a perspective view showing a different example according to the invention.
Figure 9:
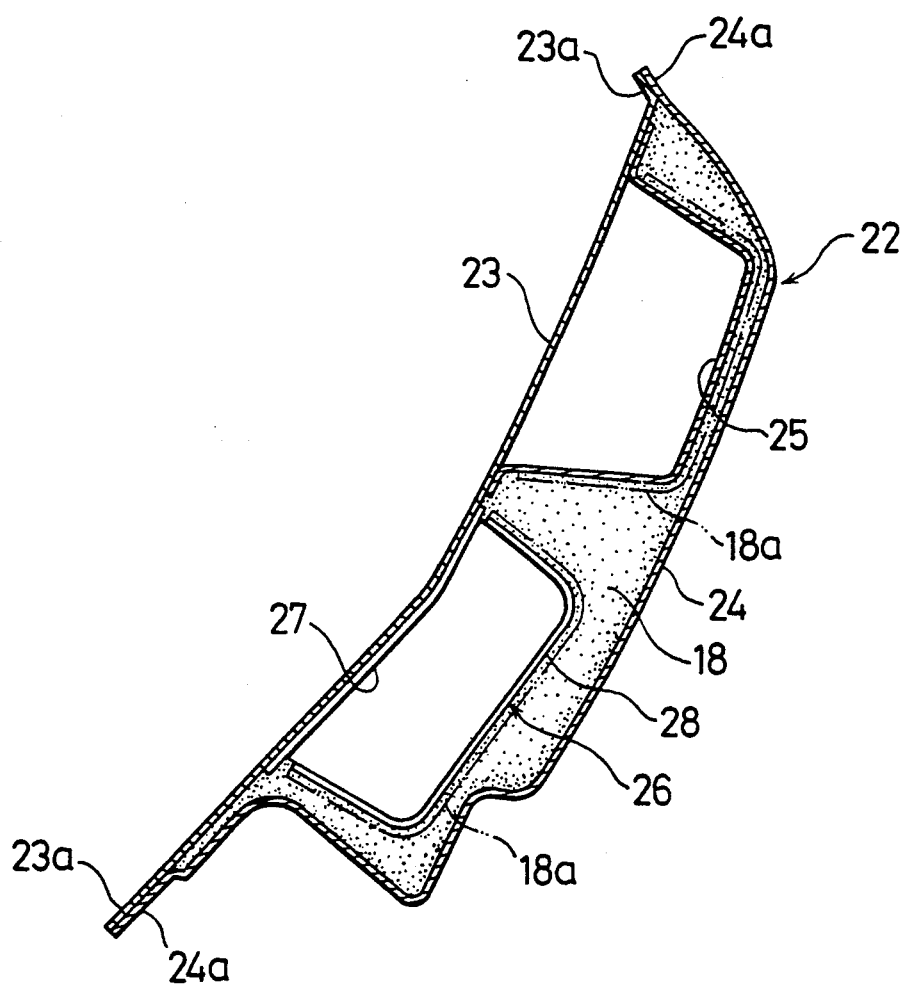
FIG. 9 is a cross-sectional view taken along the line IX—IX of FIG. 8.

FIGS. 8 and 9 indicate a case where the invention is applied to a rear pillar 22 that is a vertical skeleton element of a rear part of the vehicle. The rear pillar 22 is formed such that a rear pillar inner 23 that is an inner pillar, and a rear fender 24 that is an outer panel have their respective side-edge flanges 23a and 24a which are spot-joined to each other, to form a closed cross-sectional space. A pillar reinforcement 25 having substantially a hat-shaped cross-sectional configuration, located adjacent to the rear fender 23, is joined vertically to the inner side surface of the rear pillar inner 23. The pillar reinforcement 25 has an upper end which is closed into a bag shape, and a lower end which is joined to a rear wheel house outer (not shown).

In the embodiment, the pillar reinforce 25 serves as a bracket section, and a bracket section 26 is so arranged as to be joined to the front side part of the pillar reinforcement 25. As shown in FIG. 8, the bracket section 26 has a rectangular form in plan. A joining piece 27, which is formed in bend at one side edge of the bracket section 26, is spot-joined to the inner side surface of the rear pillar inner 23. Flanges 28 are so formed as to be bent downwardly at the peripheral edge of the bracket section 26. These flanges 28 are arranged so as to face toward and adjacent to the front side surfaces of the respective rear fender 24 and pillar reinforcement 25. Thermally foaming rubber sheets 18a are adhered respectively to the surfaces of the flanges 28 and to the surface located at a position substantially identical with the flanges 28 of the pillar reinforcement 25. The rubber sheets 18a are then foamed after completion of a white body, rust-preventive treating, during a step of finish-painting and passing the rubber sheets 18a through a painting booth, thereby drying the rubber sheets 18a. A foam rubber layer 18 is interposed among the flanges 28, the pillar reinforcement 25 and the inner surface of the rear fender 24 so that the closed cross-sectional space of the rear pillar 22 is defined by the foam rubber layer 18.

Accordingly, in case also of the embodiment, the pillar reinforcement 25 and the flanges 28 of the bracket section 26 are located adjacent to the inner side surface of the rear fender 24, and the rubber sheets 18a are foamed at this gap to form the foam rubber layer 18. For this reason, even if a rubber sheet, which is less in foaming amount, is used, the closed cross-sectional space of the rear pillar 22 is so secured as to be defined by the pillar reinforcement 25, the bracket section 26 and the foam rubber layer 18. As a result, it is possible to isolate a suspension vibrating sound and the like which are transmitted to the closed cross-sectional space of the rear pillar 22 from the rear wheel house 29.

Further, the pillar reinforcement 25 and the bracket section 26 are connected to the rear fender 24 through the foam rubber layer 18. For this reason, it is possible to further raise the rigidity of the rear pillar 22, and it is possible to secure the tension rigidity of the rear fender 24 having, on the inner side, a further large closed cross-sectional space.

Furthermore, since the foam rubber layer 18 is pasted beforehand to the surfaces of the respective bracket section 26 and pillar reinforcement 25 so that the foamed rubber layer 18 is so formed as to be heated and foamed after a rust-preventive treatment is practiced with respect to the inner surface of the rear fender 24, a non-rust-preventive treated section does not occur on the inner side surface of the rear fender 24.

In connection with the above, the invention is disclosed by the aforesaid embodiments and, in addition thereto, if the invention is applied to any body skeleton elements formed at the closed cross-sectional space by the inner panel and the outer panel such as the roof side rail, the side sill, the center pillar and the like, there can be produced advantages similar to those mentioned previously, if the invention is applied to any one of the body skeleton elements.

What is claimed is:

1. A body skeleton structure for a vehicle, comprising:

an outer panel arranged on the outside of a body;
   an inner panel arranged on the inside of the body, said inner panel cooperating with said outer panel to define a closed space;
   a bracket arranged between said outer panel and said inner panel, having flanges along the periphery thereof, one of the flanges secured abutting the inner panel such that the bracket extends from the inner panel toward the outer panel, leaving a space between the remaining flanges and the outer panel; and
   a thermally foaming element provided on a surface of said remaining flanges, said thermally foaming element being heated and foamed to be into close contact with said outer panel and/or said inner panel.

2. A body skeleton structure according to claim 1, wherein said inner panel has an access opening at a location adjacent to said bracket.

3. A body skeleton structure according to claim 1, wherein said thermally foaming element comprises a thermally foaming rubber sheet.

4. A method of manufacturing a body skeleton structure for a vehicle, comprising the steps of:

mounting an outer panel on the outside of a body;
   mounting an inner panel on the inside of said body, said inner panel cooperating with said outer panel to form a closed space;
   arranging a bracket at a location between said outer panel and said inner panel, said bracket having flanges along the periphery thereof, at least one of the flanges abuttingly secured to the inner panel such that the bracket extends from the inner panel toward the outer panel, leaving a space between the remaining flanges and the outer panel;
   mounting a thermally foaming element on a surface of said remaining flanges;
   subjecting rust-preventive painting to an inner side surface of at least said outer panel; and
   heating said thermally foaming element to foam the same, thereby being into close contact with said outer panel and/or said inner panel.

5. A method of manufacturing a body skeleton structure, according to claim 4, wherein a rubber sheet is used as said thermally foaming element.

* * * * *